(12) United States Patent
Garios

(10) Patent No.: US 10,060,116 B2
(45) Date of Patent: Aug. 28, 2018

(54) SELF-CLEANING FILTER DEVICE ADAPTABLE TO THE VOLUME OF RAINWATER AND A METHOD FOR ITS USE

(71) Applicant: Wadih Antonio Garios, Juiz de Fora (BR)

(72) Inventor: Wadih Antonio Garios, Juiz de Fora (BR)

( * ) Notice: Subject to any disclaimer, the term of this patent is extended or adjusted under 35 U.S.C. 154(b) by 100 days.

(21) Appl. No.: 15/197,175

(22) Filed: Jun. 29, 2016

(65) Prior Publication Data
US 2017/0001132 A1    Jan. 5, 2017

(30) Foreign Application Priority Data
Jul. 1, 2015 (BR) .............................. 202015016115

(51) Int. Cl.
| | |
|---|---|
| *E03B 3/04* | (2006.01) |
| *E03F 3/02* | (2006.01) |
| *E03B 1/04* | (2006.01) |
| *B01D 33/80* | (2006.01) |
| *B01D 33/54* | (2006.01) |
| *E03B 3/02* | (2006.01) |
| *E03B 7/07* | (2006.01) |
| *C02F 1/00* | (2006.01) |
| *C02F 103/00* | (2006.01) |

(52) U.S. Cl.
CPC .............. *E03F 3/02* (2013.01); *B01D 33/54* (2013.01); *B01D 33/802* (2013.01); *C02F 1/004* (2013.01); *E03B 1/04* (2013.01); *E03B 3/02* (2013.01); *E03B 7/07* (2013.01); *C02F 2103/001* (2013.01); *E03B 2001/047* (2013.01)

(58) Field of Classification Search
CPC ... E03B 1/04; E03B 1/042; E03B 3/02; E03B 7/07; E03B 2001/047; E04D 13/076; B01D 29/004; B01D 33/0338; B01D 33/54; B01D 33/802; C02F 2103/001
USPC ....... 210/747.3, 780, 785, 156, 170.03, 359, 210/433.1; 52/12, 16
See application file for complete search history.

(56) References Cited

U.S. PATENT DOCUMENTS

| | | | |
|---|---|---|---|
| 1,021,410 | A | 3/1912 | Johnson |
| 1,892,039 | A | 12/1932 | Demaree |

(Continued)

FOREIGN PATENT DOCUMENTS

| | | |
|---|---|---|
| BR | PI0705258 A2 | 7/2009 |
| BR | MU8800667 U | 9/2009 |

(Continued)

*Primary Examiner* — Christopher Upton
(74) *Attorney, Agent, or Firm* — Nevrivy Patent Law Group P.L.L.C.

(57) ABSTRACT

A self-cleaning filter device adaptable to the volume of rainwater and a method for its use are described. The self-cleaning filter device adaptable to the volume of rainwater comprises a body including a rainwater inlet, a debris outlet, at least one filtered rainwater outlet, a filter element provided inside the body and comprising a flexible element having a filter means involving and secured to it and whose upper end is connected to said rainwater inlet and whose lower end is connected to said debris outlet, said filter element being provided with an upper portion, a central portion and a lower portion, and a regulating device provided inside the body and connected to the filter element.

18 Claims, 5 Drawing Sheets

(56) References Cited

U.S. PATENT DOCUMENTS

| | | | |
|---|---|---|---|
| 2,463,814 A | 3/1949 | Skinner | |
| 3,750,886 A * | 8/1973 | Salm | E03B 3/02 |
| | | | 210/111 |
| 4,043,918 A * | 8/1977 | Orona | B01D 29/25 |
| | | | 210/359 |
| 4,801,377 A * | 1/1989 | Bolt | E03B 3/02 |
| | | | 52/12 |
| 5,114,594 A | 5/1992 | Rosebrock | |
| 5,709,051 A | 1/1998 | Mazziotti | |
| 6,077,423 A | 6/2000 | Roy | |
| 6,219,972 B1 | 4/2001 | Zusy | |
| 6,619,312 B2 * | 9/2003 | Doiron | E03B 3/02 |
| | | | 52/16 |
| 6,701,675 B1 * | 3/2004 | Ekker | E04D 13/08 |
| | | | 52/16 |
| 6,884,001 B1 | 4/2005 | Dunn | |
| 7,550,077 B2 | 6/2009 | Graf | |
| 8,033,058 B2 | 10/2011 | Block | |
| 9,206,321 B2 | 12/2015 | Yamaguchi | |
| 9,260,321 B2 * | 2/2016 | Garios | E03B 3/02 |
| 2008/0066390 A1 * | 3/2008 | Rossi | E04D 13/076 |
| | | | 52/12 |
| 2012/0037234 A1 * | 2/2012 | Eckman | E03L 31/042 |
| | | | 210/391 |
| 2012/0222998 A1 | 9/2012 | Pierzchalski | |
| 2013/0220901 A1 * | 8/2013 | Garios | E03B 3/02 |
| | | | 210/86 |
| 2017/0088437 A1 | 3/2017 | Garios | |

FOREIGN PATENT DOCUMENTS

| | | |
|---|---|---|
| BR | PI0805562 A2 | 9/2010 |
| BR | MU8901755 U | 1/2011 |
| BR | PI1000926 A2 | 11/2011 |
| CH | 673867 A5 | 4/1990 |
| DE | 19633987 A1 | 11/1997 |
| DE | 19942240 A1 | 4/2001 |
| EP | 2 224064 * | 9/2010 |
| FR | 2914426 A1 | 10/2008 |
| JP | 63290968 A | 11/1988 |
| JP | 07207714 A1 | 8/1995 |
| WO | 2010075617 A1 | 7/2010 |

* cited by examiner

SELF-CLEANING FILTER DEVICE ADAPTABLE TO THE VOLUME OF RAINWATER AND A METHOD FOR ITS USE

FIELD OF THE INVENTION

The present invention relates to a self-cleaning filter device for rainwater which adapts to rainfall conditions and enables the continuous filtering of rainwater without the need to stop its operation to exchange the filter element.

The self-cleaning filter device adaptable to the volume of rainwater object of the invention is designed for use in continuous flow filtration of rainwater collected in various building locations or residential, commercial or industrial facilities.

RELATED ART

Usually, after the beginning of a rainfall, the first collected rainwater contains a high concentration of debris, such as dust, insects and small animals, etc., which have accumulated over time in various water catchment locations and carried by the flow of rainwater to the rainwater collection and filtering system.

This debris tends to accumulate in the filter elements of the rainwater filtration devices known in the art, thus reducing their filtering capacity due to said accumulation of debris.

In particular, the accumulation of plastic bags, paper and smaller debris on the walls of the filter elements, greatly impairs the filtering ability of the filtering devices, and may even make them practically inoperative. In these situations, it is necessary to interrupt the flow of filtered rainwater in order to clean or replace the filter element. Due to this loss of filtration capacity of the filter elements of the filtration devices, preventive and/or corrective measures become necessary to solve this problem.

One such measure is to perform periodic cleaning of the filter elements of the filtering devices, or their replacement, if necessary, especially in periods when it is not raining. This measure solves the problem only in part because debris that was deposited in the filter elements during the initial period of rainfall will remain there, compromising the filtering capability of the filtering devices.

In these situations, if accumulation of debris which is deposited on the filter elements is very large, there will be a serious impairment of the filtering capacity of the rainwater filtering devices.

A solution to this problem would be to divert the flow of rainwater to the sewage system in order to clean or replace the filter elements. The disadvantage of this solution is that it would not be possible to take advantage of the water flow that was diverted to the sewer, which cannot be filtered.

One possibility of avoiding this loss would be the provision of reservoirs for the temporary storage of rainwater flow, while the filter elements of the filtration devices are being cleaned or replaced.

However, in addition to increasing the funding costs of system installation, the provision of such reservoirs could also cause problems. The storage of rainwater in these reservoirs facilitates settling of debris at the bottom, which, with time, tends to decrease storage capabilities. The possibility of organic contaminants should also be mentioned, such as the debris of dead animals and insects, which also accumulates at the bottom, which would be undesirable. As a result, it would then be necessary to perform periodic cleaning of these reservoirs, thereby increasing the cost of system maintenance.

Another solution to solve the problem would be to use multiple filtering devices, designed in such a way that the momentary stop of one of them for cleaning or replacement of filter elements would not adversely affect the filtering ability of the rainwater filtering system.

The disadvantage of this solution is the increased cost for the installation of multiple filtering devices, not to mention the need to provide periodic cleaning or replacement of filter elements, which would also increase the maintenance cost of the filtration system.

A solution to this problem is proposed in the U.S. Pat. No. 9,260,321 of common ownership of the applicant of this present application.

U.S. Pat. No. 9,260,321 describes a self-cleaning filter separator and adapter to rainwater volume having a filtering device comprising first, second and third filter elements (10, 11, 13), the first and the third filter element being expandable and flexible and the second and central element being not expandable and not flexible. All the three filter elements are provided with walls made of a screen mesh which retain debris, sand and the like but allow rainwater to pass through its mesh interstices.

The non flexible second filter element 11 has its ends connected to the flexible first and third filter elements (10, 13). A calibrator 5 is attached to the central filter element 11 and is also attached to the lower end of a rod 9 around which it can perform an oscillating motion. The location where the calibrator 5 is attached to the central filter element 11 can be changed as needed, in order to regulate the inclination of the central filter element 11. The upper end of the rod 9 is pivotally attached to the upper cover of the filtering device, in a manner that can also perform an oscillating motion.

The self-cleaning filter separator and adapter to rainwater volume of U.S. Pat. No. 9,260,321 is able to adapt to changes in the volume of rainwater, wherein the central second filter element 11 may tilt in consequence of the passing flow of rainwater thereby making the flexible first and third filter elements (10, 12) to expand or to retract depending on said passing flow of rainwater, whereby promoting the removal of debris from the interior of the filtering device, which accumulated there during the filtering process.

Consequently, the first, second and third filter elements 10, 11, 13 can perform oscillating movements between them as a consequence of the flow rate of the flow of rainwater passing through their interior, adjusting their position according to the intensity of the rain. On occasions when the flow of rainwater is low, the central semi-rigid filter element 11 is in its initial position, substantially sloped, and thus the filter elements 10, 11, 13 are in a very inclined position, forming an obtuse angle to the upper wall of the self-cleaning filter device.

In this way, the exit of debris is facilitated, even with a low flow of rainwater. When the flow of rainwater is somewhat more intense, the central rigid filter element 11 assumes a near horizontal position, due to the action of the impact of the flow of rainwater against it. When the flow of rainwater is high, the filter element bends in a direction opposite to its initial position. The articulated filter elements 10, 13 expand or retract, conforming to the movement of the central semi-rigid filter element 11.

These movements of the filter elements 10, 11, 13 serve to facilitate the filtration of water and also the expulsion of debris that accumulates inside them, providing a filtering capacity of the filtering device which remains substantially constant since there is virtually no accumulation of debris inside the filter elements 10, 11, 13.

SUMMARY OF THE INVENTION

In a first aspect the invention relates to a self-cleaning filter device adaptable to the volume of rainwater comprising a body, which includes a rainwater inlet; a debris outlet; at least one filtered rainwater outlet; a continuous filter element provided inside the body comprising a continuous flexible element able to flex, expand or contract, and a filter means involving and secured to said continuous and flexible element; said continuous filter element comprising an upper portion, a central portion and a lower portion. The continuous flexible element may comprise a spiral element.

The upper end of the continuous flexible filter element is connected to said rainwater inlet, and the lower end of the continuous flexible filter element is connected to said debris outlet; and a regulating device provided inside the body and connected to the filter element.

The regulating device may comprise a fixing structure attached to an inner upper part of the body; a rotary support member rotatably supported by the fixing structure; a flexible fixation element rotatably supported by the rotary support member, said flexible fixation element comprising first and second segments whose ends are respectively connected of said upper and lower portions of the continuous filter. Said first and second segments of the flexible fixation element may respectively be provided with adjustable first and second limiting devices.

Said filter means may comprise a multifilament fabric whose porosity is lower than the size of the smaller dimension of particulate material to be retained therein.

In a second aspect the invention relates to a method for the use of the self-cleaning filter device adaptable to the volume of rainwater, the method comprising the steps of:
- allowing collected rainwater to pass through said rainwater inlet and to enter into said continuous filter device;
- allowing the flow of rainwater to be filtered by the continuous filter element and to be collected in the bottom of said body;
- allowing the filtered rainwater to be exited via said at least one filtered rainwater outlet;
- allowing the filtered debris to be expelled throughout the debris outlet;
- allowing said upper, central and lower portions of the continuous filter elements to expand and retract, thereby making an oscillating motion responsive to the flowrate of rainwater and to the action of said first and second segments of the flexible fixation element of the regulating device;
- allowing said oscillating motion to assist the expulsion of debris from the inner part of the filter device to the debris outlet.

BRIEF DESCRIPTION OF THE DRAWINGS

The invention will now be described in greater detail together with the accompanying drawings which, for illustrative purposes only, depict some embodiments of the invention.

DETAILED DESCRIPTION OF THE INVENTION

Figure 1:
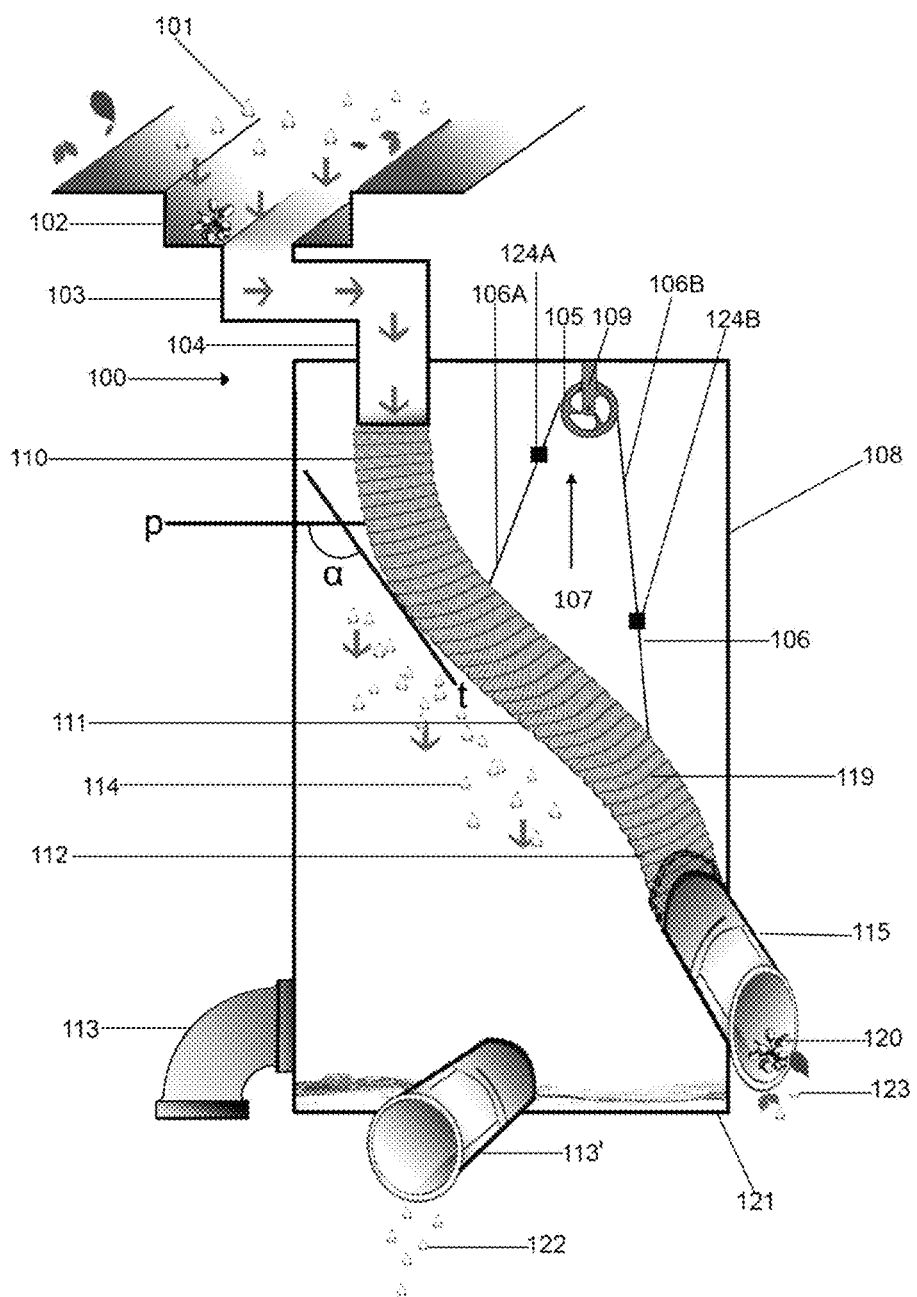
FIG. 1 depicts a front cross-sectional view of the self-cleaning filter device for rainwater, object of the present invention, in a situation in which the flow of rainwater and the volume of debris carried by rainwater to the interior of the continuous filter element is light.
Figure 2:
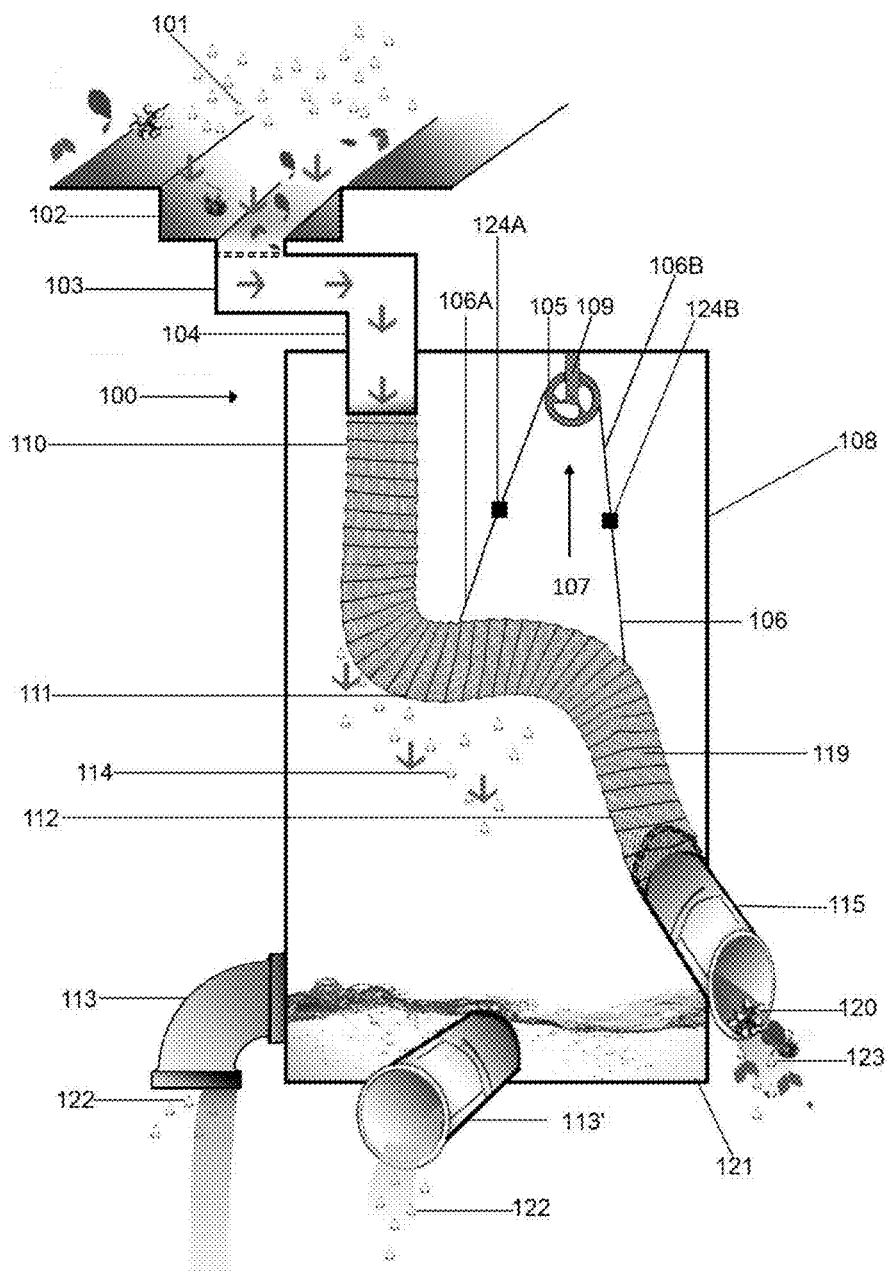
FIG. 2 depicts a front cross-sectional view of the self-cleaning filter device, object of the present invention, in a situation where the flow of rainwater and the volume of debris carried by rainwater into the continuous filter element begins to increase.
Figure 3:
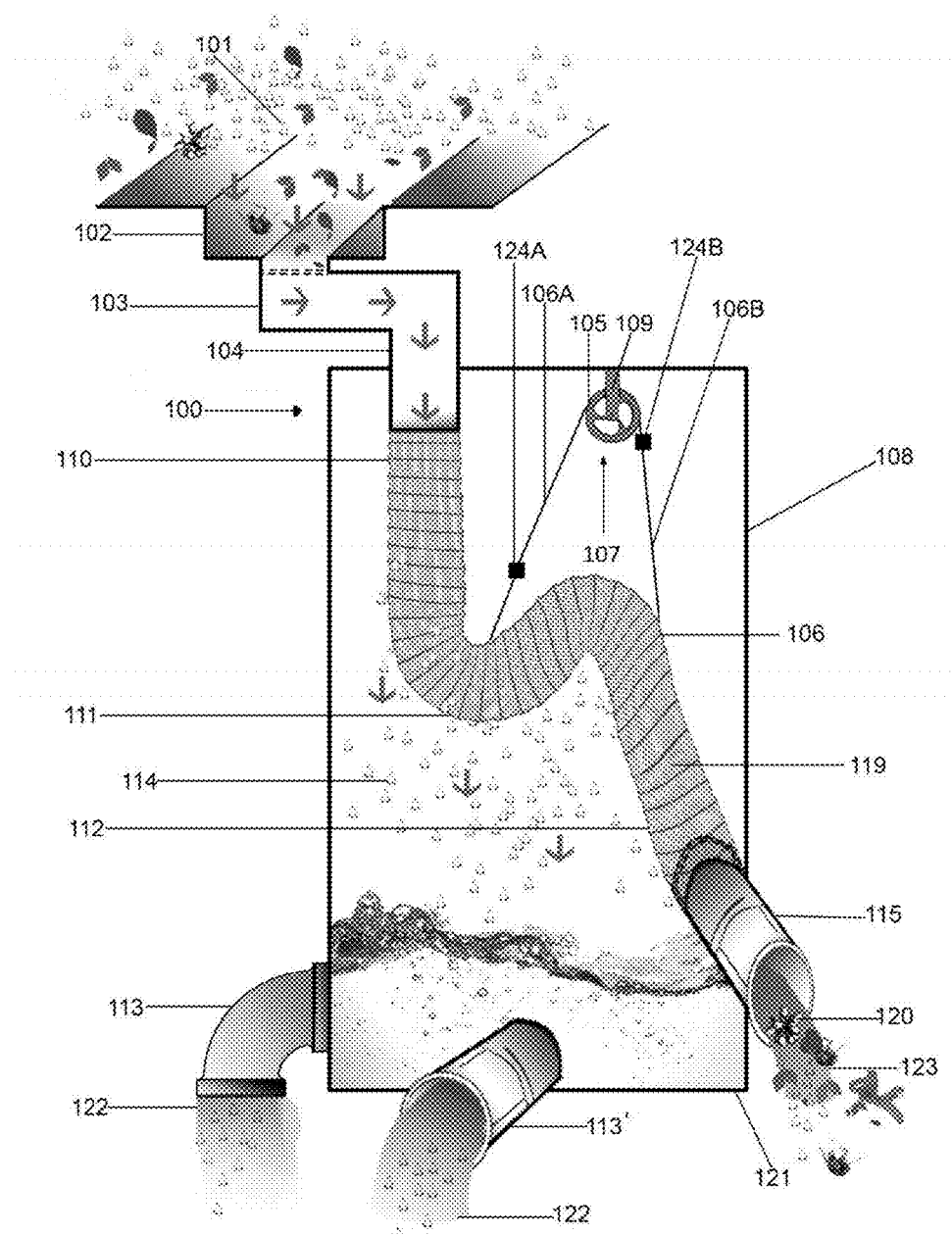
FIG. 3 depicts a front sectional view of the self-cleaning filter device, object of the present invention, in a situation where the flow of rainwater and volume of debris carried by the rainwater flow to the inside the continuous filter element is heavy.

The self-cleaning filter device adaptable to the volume of rainwater 100 can be observed in FIGS. 1, 2 and 3, object of the present invention, which comprises a body 108 provided with a rainwater inlet 104, a debris outlet 115 and at least one filtered rainwater outlet 113. Two filtered rainwater outlets 113 and 113' are shown in the drawings, but there is no limitation to the number of outlets that may be employed.

A rainwater collection system 102 collects rainwater 101 and connects to a supply duct 103, which connects to the rainwater inlet 104 of the self-cleaning filter device adaptable to the volume of rainwater 100.

The self-cleaning filter device adaptable to the volume of rainwater 100 is provided with a filter element 119 comprising an upper portion 110, a central portion 111, and a lower portion 112. The upper portion 110 of the continuous filter element 119 is connected to the rainwater inlet 104, and the lower portion 112 of the continuous filter element 119 is connected to the debris outlet 115 of the self-cleaning filter device adaptable to the volume of rainwater 100.

Figure 4:
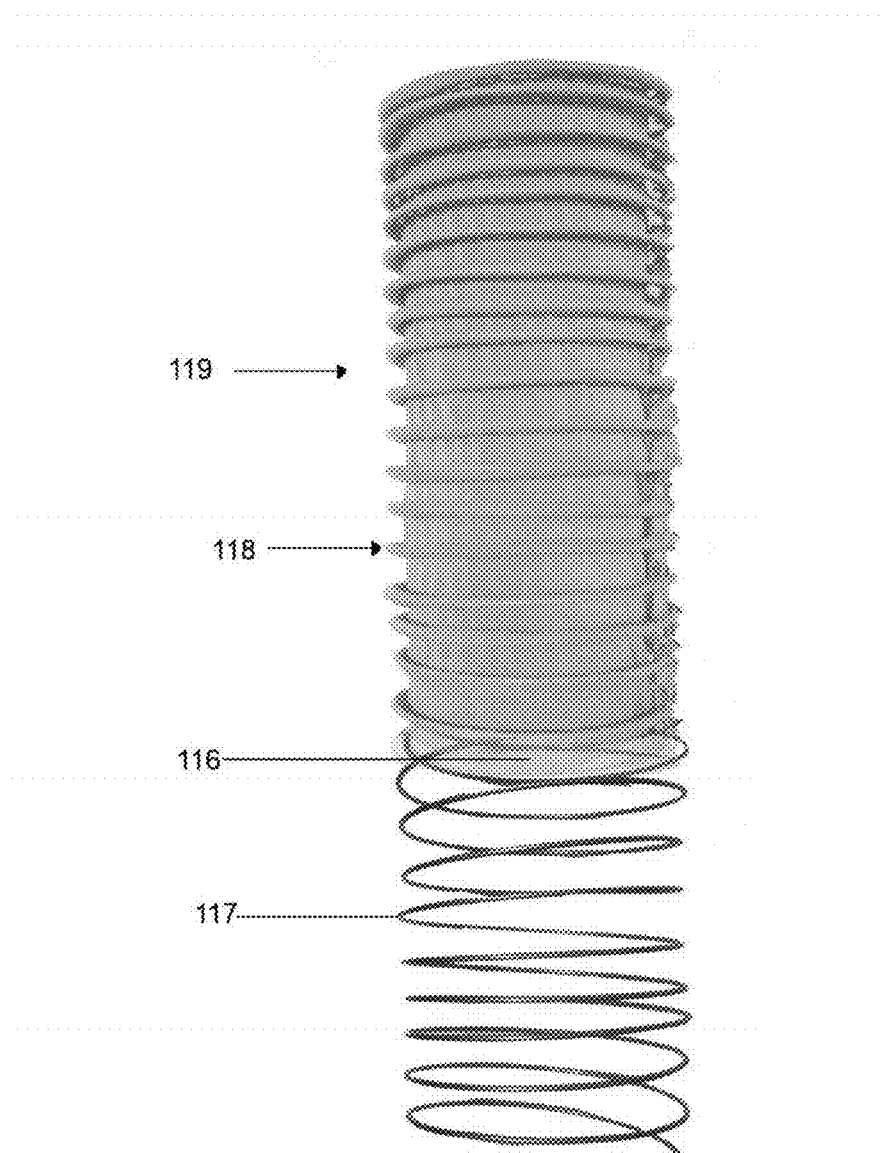
FIG. 4 depicts a front view of the filter element of the self-cleaning filter device, whose lower part is not provided with the filtering means, to show the internal spiral element.
Figure 5:
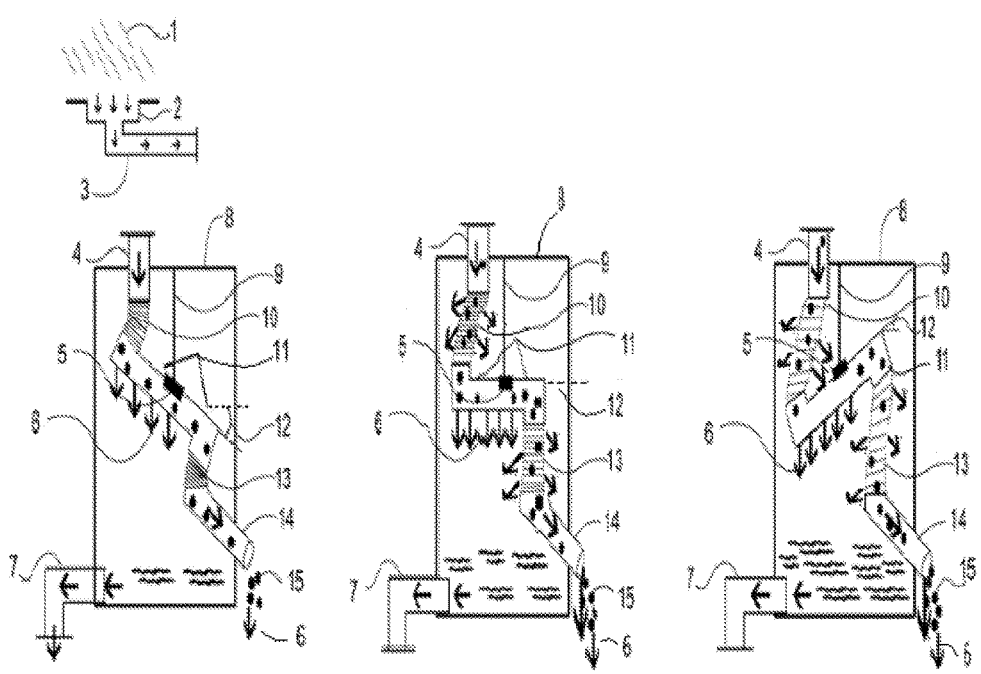
FIG. 5 depicts front views of a self-cleaning filter separator and adapter to rainwater volume depicted in U.S. Pat. No. 9,260,321.

The filter element 119 is depicted in FIG. 4. In a preferred embodiment it comprises a continuous flexible element 117, able to contract or expand. A filtering means 116 covers and is secured to the flexible element 117.

In this embodiment the flexible element 117 comprises a continuous spiral element and the filtering means 116 is a multifilament fabric, allowing little penetration of particulate material in the interstices of the web, whose porosity is lower than the size of the smaller dimension of particulate material to be retained. As such, the filter element 119 takes the form of a fully flexible an continuous bellows 118, providing the filter element 119 with flexibility and ability to be compressed or to expand.

A regulating device 107 is also provided within the self-cleaning filter device adaptable to the volume of rainwater 100, which comprises a support member 105 attached to the inner upper part of the body 108 of the self-cleaning filter device adaptable to the volume of rainwater 100 by means of a fixing structure 109.

A flexible fixation element 106, in this case a cable, rests on the support member 105 and has a first segment 106a attached to the upper portion of the filter element 110 of the filter element 119, and a second segment of the flexible fixation element 106b connected to the lower portion 112 of the filter element 119.

First and second adjustable limiting devices 124a and 124b may also be provided on the flexible fixation element 106, installed respectively on the first segment 106a and the second segment 106b, which serve to limit the travel of the flexible fixation element 106 on the rotary support member 105. The positioning of the first and second adjustable limiting devices 124a and 124b may be adjusted in order to enable the filter element 119 to better operate in accordance to the intensity of the rainwater.

The support member 105 must be able to allow the flexible fixation element 106 to easily travel along it. In a preferred embodiment the support member 105 is a pulley, which facilitates the travel of the flexible fixation element 106 along it.

The process of operation of the self-cleaning filter device adaptable to the volume of rainwater 100 is quite simple. When it starts raining, rain water 101 is collected by the rainwater collection system 102 and conducted by means of the supply duct 103 to the rainwater inlet 104 of the self-cleaning filter device adaptable to the volume of rainwater 100.

The amount of debris carried into the filter element 119 during this initial period of rain is usually more intense, and it is desirable that this debris be removed as quickly as possible so as not to impair the usefulness of the filter element 119.

During periods of no rain, or when the volume of rainwater passing through the interior of the filter element 119 is not yet intense, the filter element 119 assumes a shape as shown in FIG. 1, wherein the upper region of the upper portion 110 of the filter element 119 is substantially upright, for being connected to the rainwater inlet 104, but the remaining part of the upper portion 110 and the central 111 and lower 112 portions of the filter element 119 are in a substantially inclined position, wherein an imaginary tangent line "t" located at the middle region of the upper portion 110 of the filter element 119 forms an obtuse angle "a" with respect to an imaginary horizontal line "p", as can be seen in FIG. 1.

In this initial operating situation, where the filter element 119 is substantially inclined and the flexible element 117 are substantially retracted, which facilitates the removal of waste because the water flow, even if still at low volume, can lead debris toward the debris outlet 115 due to the substantial inclination of the filter element 119.

A filtering process of rainwater flow will occur at the same time that debris is removed from the interior of the filter element 119. As can be seen in FIG. 1, filtered rain water 114 exits the filter element 119 and will be deposited in the lower body region 121 of the body 108 of the self-cleaning filter device adaptable to the volume of rainwater 100, which is drained by means of at least one filtered rainwater outlet 113.

In a situation where rain intensity begins to increase, and becomes moderate, the force exerted by the impact of the flow of rainwater and debris on the filter element 119 will increase, especially on its upper portion 110. This impact force will cause the flexible element 117 to expand. In the present embodiment, as the flexible element 117 is a spiral element, its spires begin to move away from each other in certain regions, especially in border regions between the central portion 111 and the upper and lower portions 110, 112 of the filter element 119.

Since the first and second segments 106a, 106b of the flexible fixation element 106 regulating device 107 are respectively connected to the upper portion 110 and the lower portion 112 of the filter element 119, they cause a limitation in this movement of expansion of the flexible element 117. In the present embodiment, as the flexible element 117 is a spiral element, the movement of its spires away from each other is limited. Despite this limitation, the fact that the flexible fixation element 106 of the regulating device 107 can move on the surface of the rotary support member 105 permits some adjustments to occur in the positioning of the filter element 119, but only in a limited manner.

With this limitation of movement, the upper portion 110 and the central portion 111 of the filter element 119 will initially tend to expand more. In this situation the impact of the rainwater flow containing debris against the upper portion 110 and the central portion 111 of the filter element 119 will cause the flexible element 117 to expand in the regions of these two upper 110 and central 111 portions of the filter element 119. The lower portion 112 will also move away from each other, as the regulating device 107 limits the movement of the filter element 119. In the present embodiment, as the flexible element 117 is a spiral element, the spires will move away from each other.

Therefore, the upper portion 110 and the central 111 and lower 112 portions of the filter element 119 will begin to change their substantially inclined shape. In this situation the central portion 111 of the filter element 119 tends to assume a substantially horizontal position, which favors filtering of the passing flow of rainwater in the region of the central portion 111 of the filter element 119, in special in the region of the central portion 111 of the filter element 119, thereby reducing waste of water.

In the event of a significant increase in the flow of rainwater in a heavier rain situation, and an ensuing increase in the impact of this flow on the filter element 119, and also by the debris carried by the rainwater flow, the flexible element 117 will have a stronger tendency to expand, and in special the lower portion 112. In the present embodiment, as the flexible element 117 is a spiral element, its spires will have a tendency to move away from each other. Consequently the spires of the upper portion 110 and the central portion 111 of the filter element 119 will tend to expand even more, the same occurring with the spires of the flexible element 117 in the lower portion 112, which will also move away from each other even more.

Consequently the filter element 119 assumes a very similar configuration to a letter "S", as depicted in FIG. 3, due to the limitation of its movement caused by the regulating device 107.

In this process of variations of the shape of the filter element 119, as a result of variations in the flow of rainwater, the flexible element 117 will tend to suffer alternate expansion and retraction movements, thereby causing a huge oscillating motion in the whole filter element 119, and the combination of the variations of the shape of the filter element 119 and this oscillating motion, in special in the region of the central portion 111 of the filter element 119, will increase the expulsion of debris from the interior of the filter element 119 towards the debris outlet 115.

Thus, the form to be taken by the filter element 119 will always be adjusted as a consequence of the flowrate of the rainwater flow and the volume of debris carried by this flow.

It should be mentioned that the first and second limiting devices 124a and 124b serve to limit the travel of the flexible fixation element 106 on the surface of the rotary support member 105 in order to guarantee that the filter element 119 will suffer the variations in shape shown above, within limits that ensure that the filtering process always occurs effectively.

It is also important to mention that the shapes depicted in FIGS. 1, 2 and 3 which the filter element 119 assumes in view of the flow rate of rainwater are exemplary only, and cannot be considered as limitation of the invention. In use, the filter element 119 will be able to assume a number of shapes responsive to the flowrate of rainwater an debris.

The use of the filter element 119 provided with a flexible element 117 allows the debris carried by rainwater flow to be rapidly discarded by the debris outlet 115, which favors the filtering process and reduces waste of water. In FIGS. 1, 2 and 3 it can be observed filtered rainwater flow 122 exiting the filtered rainwater outlet 113.

Tests made by the Applicant, in which the rainwater flow contained considerable amount of debris, showed the volume of unfiltered rainwater flow 123 that could not be filtered, which exits the debris outlet 115, to be very small.

The self-cleaning filter device adaptable to the volume of rainwater 100 is provided with inspection windows, not shown in the Figures, which facilitate the cleaning of the filter, the cleaning or replacing of the filter element 119, regulation of the regulating device 107, periodic inspections, etc.

For example, in situations in which the interstices of the filter means 116 are impregnated with small particulate material, thereby reducing its capacity to filter rainwater, these inspection windows may be used to allow access for maintenance workers to use high-pressure water jets to facilitate the removal of these small particulate particles from inside the interstices of the filter means 116.

If it is necessary to change the positions where the first and second segments 106a, 106b of the flexible fixation element 106 of the regulating device 107 in order to meet a specific need, multiple connection points may be provided in the filter element 119 to connect the ends of the first and second segments 106a, 106b of the flexible fixation element 106, thereby allowing to adjust the regulation of the regulating device 107 according to momentary convenience.

As a reference, the table below gives some values used by experts to define rain intensity:

| | |
|---|---|
| Light rain | Precipitation whose intensity is less than 5.0 mm/h. |
| Moderate rain | Precipitation whose intensity is comprised between 5.0 and 25 mm/h. |
| Heavy rain | Precipitation whose intensity is comprised between 25.1 and 50 mm/h. |
| Very heavy rain | Precipitation whose intensity is greater than 50.0 mm/h. |
| Thunderstorms | Intense rainfall which occurs in a short time period and is spatially restricted. |

The provision of a self-cleaning filter device adaptable to the volume of rainwater 100 having a fully flexible and continuous filter element 119 able to contract or to expand enables a prompt reaction of said continuous filter element 119 to the variations of the flow of rainwater, thereby making the self-cleaning filter device adaptable to the volume of rainwater 100 object of the invention very efficient to filter a rainwater flow, minimizing the losses of rainwater.

Modifications and adjustments can be made in the self-cleaning filter device adaptable to the volume of rainwater 100 without departing from its basic concept, as described above.

For example, is possible to connect separate parts of flexible filter elements each other in order to provide a filter element having basically the same features as the continuous filter element 119 described herein.

However, it is preferable to use a continuous filter element 119 as disclosed above, in order to prevent accidental disconnections between the connected parts, which may occur in consequence of the vigorous movements of expansion and retraction of the filter element resulting from the passage of the flow of rainwater into it.

LIST OF COMPONENTS 100 self-cleaning filter device adaptable to the volume of rainwater
102 rainwater collection system
103 supply duct
104 rainwater inlet
105 rotary support member
106 flexible fixation element
106a first segment (of the flexible fixation element)
106b second segment (of the flexible fixation element)
107 regulating device
108 body
109 fixing structure
110 upper portion (of the filter element)
111 central portion (of the filter element)
112 lower portion (of the filter element)
113 filtered rainwater outlet
114 filtered rainwater
115 debris outlet
116 filter means
117 flexible element
118 bellows
119 filter element
120 discarded debris
121 lower body region
122 filtered rainwater flow
123 unfiltered rainwater flow
124a first limiting device (of the first segment 106a of the flexible fixation
segment 106)
124b second limiting device of the second segment 106b of the flexible fixation
element 106

The invention claimed is:

1. A self-cleaning filter device adaptable to the volume of rainwater comprising a body including:
a rainwater inlet;
a debris outlet;
at least one filtered rainwater outlet;
a flexible filter element provided inside the body and comprising an expandable and contractible fully flexible element having a filter means involving and secured to it and whose upper end is connected to said rainwater inlet and whose lower end is connected to said debris outlet, said filter element being provided with an upper portion, a central portion and a lower portion; and
a regulating device provided inside the body and connected to the filter element.

2. The self-cleaning filter device adaptable to the volume of rainwater as in claim 1, wherein said flexible element comprises a spiral element.

3. The self-cleaning filter device adaptable to the volume of rainwater as in claim 2, wherein said filter element comprises separate flexible parts connected each other.

4. The self-cleaning filter device adaptable to the volume of rainwater as in claim 3, wherein said regulating device comprises;
a fixing structure attached to an inner upper part of the body;
a support member supported by the fixing structure; and
a flexible fixation element supported by the support member, said flexible fixation element comprising first and second segments whose ends are respectively connected of said upper and lower portions of the filter element.

5. The self-cleaning filter device adaptable to the volume of rainwater as in claim 4, wherein said first and second segments of the flexible fixation element are respectively provided with adjustable first and second limiting devices.

6. The self-cleaning filter device adaptable to the volume of rainwater as in claim 5, wherein said support member is a pulley.

7. The self-cleaning filter device adaptable to the volume of rainwater as in claim 6, wherein said filter means comprises a multifilament fabric whose porosity is lower than the size of the smaller dimension of particulate material to be retained therein.

8. A self-cleaning filter device adaptable to the volume of rainwater comprising a body including:
 a rainwater inlet;
 a debris outlet;
 at least one filtered rainwater outlet;
 a continuous filter element provided inside the body and comprising a continuous and expandable flexible element having a filter means involving and secured to it and whose upper end is connected to said rainwater inlet and whose lower end is connected to said debris outlet, said filter element being provided with an upper portion, a central portion and a lower portion; and
 a regulating device provided inside the body and connected to the filter element.

9. The self-cleaning filter device adaptable to the volume of rainwater as in claim 8, wherein said regulating device comprises;
 a fixing structure attached to an inner upper part of the body;
 a support member supported by the fixing structure; and
 a flexible fixation element supported by the support member, said flexible fixation element comprising first and second segments whose ends are respectively connected of said upper and lower portions of the filter element.

10. The self-cleaning filter device adaptable to the volume of rainwater as in claim 9, wherein said first and second segments of the flexible fixation element are respectively provided with adjustable first and second limiting devices.

11. The self-cleaning filter device adaptable to the volume of rainwater as in claim 10, wherein said support member is a pulley.

12. The self-cleaning filter device adaptable to the volume of rainwater as in claim 11, wherein said filter means comprises a multifilament fabric whose porosity is lower than the size of the smaller dimension of particulate material to be retained therein.

13. The self-cleaning filter device adaptable to the volume of rainwater as in claim 12, wherein said continuous and expandable flexible element is a continuous spiral.

14. A method to filter rainwater using a self-cleaning filter device adaptable to the volume of rainwater provided with a body including:
 a rainwater inlet;
 a debris outlet;
 at least one filtered rainwater outlet;
 a filter element provided inside the body and comprising an expandable flexible element having a filter means involving and secured to it, said filter element being provided with an upper portion, whose upper end is connected to said rainwater inlet, a central portion and a lower portion, which is connected to said debris outlet;
 a regulating device provided inside the body and connected to the filter element, comprising:
 a fixing structure attached to an inner upper part of the body;
 a support member supported by the fixing structure; and
 a flexible fixation element supported by the support member, said flexible fixation element comprising first and second segments whose ends are respectively connected of said upper and lower portions of the filter element, said first and second segments of the flexible fixation element are respectively provided with adjustable first and second limiting devices;
 the method comprising the steps of:
 allowing collected rainwater to pass through said rainwater inlet and to enter into said filter device;
 allowing the flow of rainwater to be filtered by the filter element and to be collected in the bottom of said body;
 allowing the filtered rainwater to be exited via said at least one filtered rainwater outlet;
 allowing the filtered debris to be expelled throughout the debris outlet;
 allowing said upper, central and lower portions of the filter elements to expand and retract, thereby making an oscillating motion responsive to both the flowrate of rainwater and the concomitant action of said first and second segments of the flexible fixation element of the regulating device; and
 allowing said oscillating motion to assist the expulsion of debris from the inner part of the filter device to the debris outlet.

15. The method to filter rainwater as in claim 14 wherein said flexible element is a spiral element.

16. The method to filter rainwater as in claim 15 wherein said filter means comprises a multifilament fabric whose porosity is lower than the size of the smaller dimension of particulate material to be retained therein.

17. The method to filter rainwater as in claim 16 wherein said first and second segments of the flexible fixation element are respectively provided with adjustable first and second limiting devices and said support member is a pulley.

18. The method to filter rainwater as in claim 17, wherein said spiral element is continuous.

* * * * *